US012127497B2

(12) United States Patent
Walter et al.

(10) Patent No.: US 12,127,497 B2
(45) Date of Patent: Oct. 29, 2024

(54) PLANTER ROW UNIT DOWNFORCE CONTROL WITH GROUND VIEW SENSOR

(71) Applicant: DEERE & COMPANY, Moline, IL (US)

(72) Inventors: Jason D. Walter, Bettendorf, IA (US); Michael E. Frasier, Iowa City, IA (US); Lawrence D. Green, Bettendorf, IA (US); James Z. Liu, Venice, FL (US); Donald K. Landphair, Bettendorf, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 17/550,888

(22) Filed: Dec. 14, 2021

(65) Prior Publication Data

US 2022/0174859 A1 Jun. 9, 2022

Related U.S. Application Data

(63) Continuation of application No. 16/293,177, filed on Mar. 5, 2019, now Pat. No. 11,202,404.

(51) Int. Cl.
*A01B 49/06* (2006.01)
*A01B 63/00* (2006.01)
(Continued)

(52) U.S. Cl.
CPC ............ *A01C 7/203* (2013.01); *A01B 49/06* (2013.01); *A01B 63/008* (2013.01); *A01C 5/064* (2013.01); *A01C 5/068* (2013.01); *A01C 7/208* (2013.01)

(58) Field of Classification Search
CPC ......... A01C 7/203; A01C 5/064; A01C 5/068; A01C 7/208; A01C 7/205; A01B 49/06; A01B 63/008
(Continued)

(56) References Cited

U.S. PATENT DOCUMENTS

| 2,192,948 A | 3/1940 | White |
| 4,413,685 A | 11/1983 | Gremelspacher et al. |

(Continued)

FOREIGN PATENT DOCUMENTS

| EP | 171719 A2 | 2/1986 |
| EP | 2322026 A1 | 5/2011 |

(Continued)

OTHER PUBLICATIONS

EP17194407.7 Extended European Search Report dated Jan. 8, 2018 (9 pages).
(Continued)

*Primary Examiner* — Adam D Tissot
*Assistant Examiner* — Jean W Charleston
(74) *Attorney, Agent, or Firm* — Michael Best & Friedrich LLP

(57) ABSTRACT

A row unit for a seeding machine includes a ground view sensor coupled to the frame. The ground view sensor is operable to sense the furrow and generate depth signals corresponding to actual sensed depth of the furrow. The row unit also includes a controller configured to receive the signals, and a downforce adjustment mechanism coupled to the frame and to the controller. The controller is configured to activate the downforce adjustment mechanism to adjust a downforce on the frame based on the signals received by the controller.

23 Claims, 3 Drawing Sheets

(51) Int. Cl.
*A01C 5/06* (2006.01)
*A01C 7/20* (2006.01)

(58) Field of Classification Search
USPC .......................................................... 701/50
See application file for complete search history.

(56) References Cited

U.S. PATENT DOCUMENTS

| | | | |
|---|---|---|---|
| 4,445,923 A | 5/1984 | Shetterly | |
| 4,850,454 A | 7/1989 | Korody | |
| 4,915,014 A | 4/1990 | Gilmore et al. | |
| 5,201,372 A | 4/1993 | Thompson et al. | |
| 5,479,992 A | 1/1996 | Bassett | |
| 5,591,945 A | 1/1997 | Kent | |
| 6,076,611 A | 6/2000 | Rozendaal | |
| 6,216,794 B1 | 4/2001 | Buchl | |
| 6,530,334 B2 | 3/2003 | Hagny | |
| 6,688,244 B1 | 2/2004 | Meyer et al. | |
| 7,360,495 B1 | 4/2008 | Martin | |
| 7,673,570 B1 | 3/2010 | Bassett | |
| 8,380,356 B1 * | 2/2013 | Zielke | A01C 7/205 |
| | | | 221/211 |
| 8,863,676 B2 * | 10/2014 | Brockmann | A01C 7/088 |
| | | | 111/186 |
| 9,107,337 B2 | 8/2015 | Bassett | |
| 9,198,343 B2 | 12/2015 | Mariman et al. | |
| 9,232,687 B2 | 1/2016 | Bassett | |
| 9,506,750 B2 | 11/2016 | Last | |
| 9,554,504 B2 | 1/2017 | Houck | |
| 9,693,496 B2 | 7/2017 | Tevs et al. | |
| 9,750,174 B2 | 9/2017 | Sauder et al. | |
| 9,888,624 B2 | 2/2018 | Maniar et al. | |
| 9,968,030 B2 | 5/2018 | Kowalchuk et al. | |
| 10,091,926 B2 | 10/2018 | Maro | |
| 10,462,956 B2 | 11/2019 | Hamilton | |
| 10,555,454 B2 | 2/2020 | Garner et al. | |
| 10,681,859 B2 | 6/2020 | Rhodes et al. | |
| 10,687,456 B2 | 6/2020 | Garner et al. | |
| 10,687,457 B2 | 6/2020 | Hubner et al. | |
| 10,694,658 B2 | 6/2020 | Wonderlich et al. | |
| 10,918,012 B2 | 2/2021 | Rhodes | |
| 11,122,731 B2 | 9/2021 | Hubner et al. | |
| 11,134,606 B2 | 10/2021 | Salowitz et al. | |
| 11,202,404 B2 | 12/2021 | Walter et al. | |
| 11,206,754 B2 | 12/2021 | Rhodes | |
| 11,279,366 B1 | 3/2022 | Shroll et al. | |
| 2002/0174813 A1 | 11/2002 | Hagny | |
| 2005/0155536 A1 | 7/2005 | Wendte et al. | |
| 2010/0180695 A1 | 7/2010 | Sauder et al. | |
| 2011/0313575 A1 | 12/2011 | Kowalchuk et al. | |
| 2012/0048160 A1 | 3/2012 | Adams et al. | |
| 2012/0060730 A1 | 3/2012 | Bassett | |
| 2012/0186503 A1 * | 7/2012 | Sauder | A01C 7/205 |
| | | | 701/50 |
| 2014/0026748 A1 | 1/2014 | Stoller et al. | |
| 2014/0048296 A1 | 2/2014 | Bassett | |
| 2014/0076047 A1 | 3/2014 | Liu | |
| 2014/0116735 A1 | 5/2014 | Bassett | |
| 2014/0303854 A1 | 10/2014 | Zielke | |
| 2015/0094917 A1 * | 4/2015 | Blomme | A01C 5/062 |
| | | | 701/50 |
| 2015/0230391 A1 * | 8/2015 | Houck | A01B 63/008 |
| | | | 701/50 |
| 2015/0237790 A1 | 8/2015 | Redden et al. | |
| 2016/0101426 A1 | 4/2016 | Heinrichs | |
| 2016/0128263 A1 | 5/2016 | Bassett | |
| 2016/0128265 A1 | 5/2016 | Bassett | |
| 2016/0165789 A1 | 6/2016 | Gervais et al. | |
| 2016/0212928 A1 | 7/2016 | Wileniec et al. | |
| 2016/0249525 A1 * | 9/2016 | Baurer | A01C 19/02 |
| | | | 701/50 |
| 2016/0338257 A1 | 11/2016 | Sauder et al. | |
| 2016/0348529 A1 | 12/2016 | Emmons et al. | |
| 2017/0086349 A1 * | 3/2017 | Tevs | A01C 7/203 |
| 2017/0086360 A1 | 3/2017 | Gamer et al. | |
| 2017/0086362 A1 * | 3/2017 | Natarjan | A01C 5/068 |
| 2017/0094894 A1 | 4/2017 | Heim et al. | |
| 2017/0303465 A1 | 10/2017 | Koch et al. | |
| 2017/0367251 A1 | 12/2017 | Hamilton | |
| 2018/0042171 A1 | 2/2018 | Maro | |
| 2018/0092287 A1 | 4/2018 | Garner et al. | |
| 2018/0092288 A1 | 4/2018 | Garner et al. | |
| 2018/0092289 A1 | 4/2018 | Wonderlich et al. | |
| 2018/0092290 A1 | 4/2018 | Hubner et al. | |
| 2018/0092292 A1 | 4/2018 | Rhodes et al. | |
| 2018/0092293 A1 | 4/2018 | Rhodes | |
| 2018/0114305 A1 | 4/2018 | Strnad et al. | |
| 2018/0116098 A1 | 5/2018 | Bassett | |
| 2018/0120082 A1 | 5/2018 | Rhodes et al. | |
| 2018/0153088 A1 | 6/2018 | Sporrer et al. | |
| 2019/0124824 A1 * | 5/2019 | Hubner | A01C 7/205 |
| 2019/0183036 A1 * | 6/2019 | Leimkuehler | A01C 5/062 |
| 2020/0359559 A1 | 11/2020 | Koch et al. | |
| 2021/0127549 A1 | 5/2021 | Kinney et al. | |
| 2022/0022366 A1 | 1/2022 | Salowitz et al. | |
| 2022/0167994 A1 | 6/2022 | Roberts | |
| 2022/0183205 A1 | 6/2022 | Rhodes | |

FOREIGN PATENT DOCUMENTS

| | | | |
|---|---|---|---|
| EP | 3072763 A1 | 9/2016 | |
| EP | 3150046 A1 | 4/2017 | |
| EP | 3213617 A1 | 9/2017 | |
| EP | 3300563 A1 | 4/2018 | |
| EP | 3300567 A1 | 4/2018 | |
| EP | 3300569 A1 | 4/2018 | |
| EP | 2701482 B1 * | 6/2018 | A01B 49/04 |
| WO | 2008086283 A2 | 7/2008 | |
| WO | 2012149367 A1 | 11/2012 | |
| WO | 2014066650 A1 | 5/2014 | |
| WO | 2014066654 A1 | 5/2014 | |
| WO | 2016073964 A1 | 5/2016 | |
| WO | WO-2016182906 A1 * | 11/2016 | A01B 63/1112 |
| WO | 2018144553 A1 | 8/2018 | |

OTHER PUBLICATIONS

European Patent Office Extended Search Report for Application No. 18203540.2 dated Mar. 19, 2019 (11 pages).
European Patent Office Extended Search Report for Application No. 19152876.9 dated Jul. 4, 2019 (11 pages).
United States Patent Office Action for U.S. Appl. No. 15/692,538 dated May 20, 2019 (13 pages).
Deere & Company, "Downforce System Options," <http://salesmanual.deere.com/sales/salesmanual/en_NA/seeding/2018/feature/row_units_and_drill_opener/planters/downforce_system.html> web page available as early as Sep. 25, 2018 (4 pages).
Extended European Search Report and Written Opinion issued in European Patent Application No. 20169081.5, dated Oct. 1, 2020 (8 pages).
Vandoren, V.J. "Exploring the Basic Concepts of Multivariable Control," Feb. 7, 2017, Control Engineering (controleng.com) (Year: 2017).
Extended European Search Report Issued in European Patent Application No. 20158440.6 dated Jul. 6, 2020 (8 pages).
Hanna et al., "Soil Loading Effets of Planter Depth-Gauge Wheels on Early Corn Growth," Agricultural and Biosystems Engineering, 2010, 26(4):551-556.
Pruitt, "Choosing an Intel RealSense Depth Camera," <https://realsense.intel.com/compare/> dated May 24, 2018 (5pages).
Yoshida, "Can Huawei Match Apple TrueDepth?" <https://www.eetimes.com/document.asp?doc_id=1333098> dated Mar. 22, 2018 (3 pages).

* cited by examiner

PLANTER ROW UNIT DOWNFORCE CONTROL WITH GROUND VIEW SENSOR

CROSS-REFERENCE TO RELATED APPLICATIONS

This application is a continuation of U.S. application Ser. No. 16/293,177 filed Mar. 5, 2019, the entire contents of which are incorporated by reference herein.

BACKGROUND

The present disclosure relates to systems and methods for planting seeds, in particular with a row unit for a seeding machine.

Various factors affect crop yields. One factor, for example, is seed depth in a furrow. A productive crop yield is typically one that grows and emerges uniformly from the soil. Understanding planting depth provides valuable information that may be used to generate a productive crop yield.

SUMMARY

In one aspect, the disclosure provides a row unit for a seeding machine. The row unit includes a frame supporting a furrow opener for opening a furrow in the soil, a gauge wheel for rolling atop the soil, a seed meter for dispensing seeds into the furrow, and a furrow closer for closing the furrow. The row unit further includes a downforce adjustment mechanism operable to push the row unit frame toward the soil to engage the furrow opener, the gauge wheel, and the furrow closer with the soil. A ground view sensor of the row unit is operable to sense the furrow and generate depth signals corresponding to actual sensed depth of the furrow. A controller is configured to receive the depth signals and output a control signal to the downforce adjustment mechanism, and the controller is programmed to adjust the downforce adjustment mechanism to adjust a downforce on the frame based on the depth signals such that downforce is increased in response to the depth signal indicating a depth less than a set point depth, and downforce is decreased in response to the depth signal indicating a depth greater than the set point depth.

In another aspect, the disclosure provides a control system for adjusting downforce on a row unit for a seeding machine based on depth of a seeding furrow. The control system includes a ground view sensor operable to sense the furrow and generate depth signals corresponding to actual sensed depth of the furrow. A processor is configured to receive the depth signals from the ground view sensor and further configured to send signals to the downforce adjustment mechanism to adjust a downforce based on the depth signals in order to provide closed-loop furrow depth adjustment.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
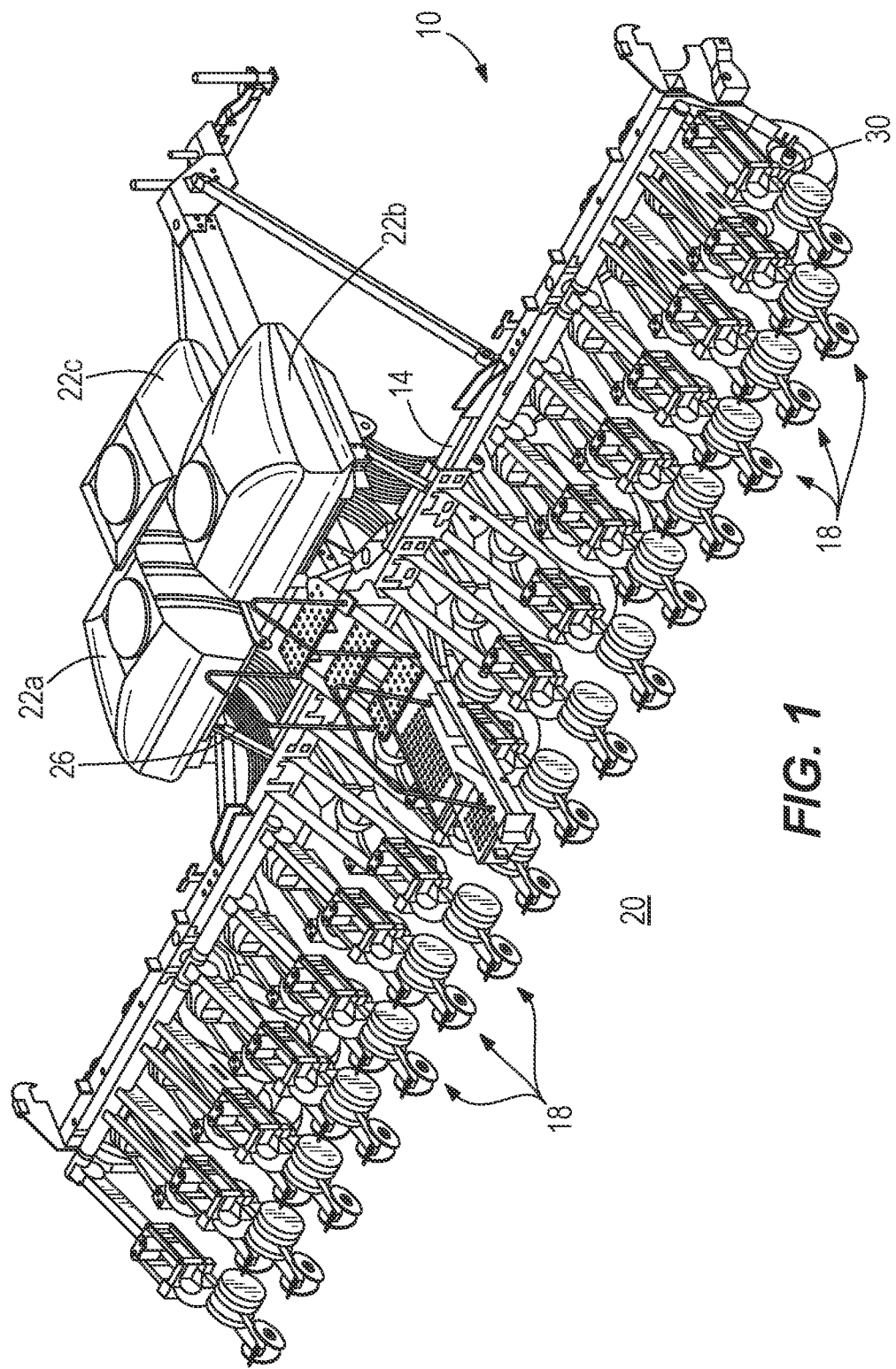
FIG. 1 is a perspective view of a seeding machine.

FIG. 1 illustrates a seeding machine 10 (e.g., a row crop planter). The seeding machine 10 includes a main frame 14. A plurality of individual row units 18 are coupled (e.g., mounted) on a rear portion of the main frame 14 such that the row units 18 are pulled over or across a layer of soil 20. Alternatively, the row units 18 may be positioned forward of the frame 14 and are pushed over or across the soil layer 20, or the machine may have a combination of push and pull row units 18. Seed sources, such as storage tanks 22a-22c, are coupled to the main frame 14 and hold seed that is delivered, e.g., pneumatically or in any other suitable manner, to a mini-hopper (not shown) associated with each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Each row unit 18 is connected to a conduit 26 such that each row unit 18 is coupled to a storage tank 22a-22c to receive seed. As illustrated by way of example only in FIG. 1, each row unit 18 further includes its own sub-frame 30, to which various components (e.g., a furrow opener, a furrow closer, etc.) are mounted.

Figure 2:
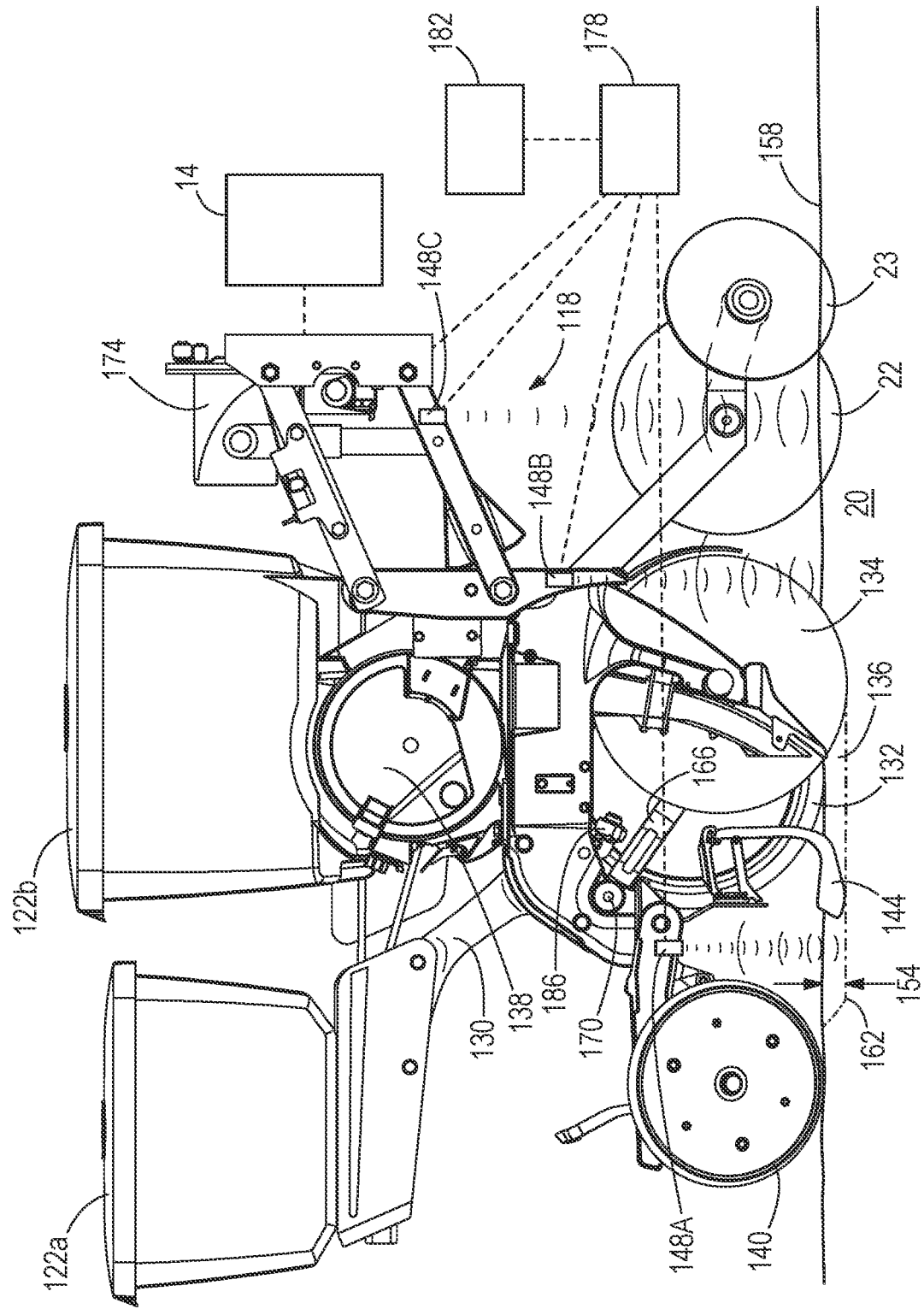
FIG. 2 is a partially schematic side view of a row unit of the seeding machine of FIG. 1, including ground view sensors according to an exemplary embodiment.

FIG. 2 illustrates an example of a row unit 118 that may be used in place of any one of the row units 18 in FIG. 1. Similar to the row unit 18, the row unit 118 is also coupled to the main frame 14. In some constructions, a plurality of row units 118 are coupled to the main frame 14, similar to the row units 18 in FIG. 1. As illustrated in FIG. 2, each row unit 118 includes hoppers 122a, 122b, which hold chemical and seed, respectively (as opposed to the row unit 18 receiving seed from bulk storage as in the construction illustrated in FIG. 1). The hoppers 122a, 122b are coupled to a row unit sub-frame 130. Each row unit 118 also includes a gauge wheel or wheels 132 coupled to the row unit sub-frame 130. The gauge wheel 132 contacts and rolls along the soil 20, and a furrow opener 134 (e.g., an opening wheel or blade or other structure having a stationary or rotating surface that contacts and moves soil away to form a furrow) is coupled to the row unit sub-frame 130 for forming a furrow 136 (illustrated schematically) in the soil 20. A seed metering device 138 coupled to the row unit sub-frame 130 receives seeds from the hopper 122b and meters and dispenses the seeds into the furrow 136. A furrow closer 140 (e.g., a closing and packing wheel or wheels or other structure having a stationary or rotating surface that contacts and presses soil 20) coupled to the row unit sub-frame 130 pushes soil around the seeds to close the furrow 136. Each row unit 118 may also include a seed firmer 144 (e.g. an angled arm as illustrated in FIG. 2, a press wheel coupled to a press wheel arm, or other structure that firms a seed) coupled to the row unit sub-frame 130 that firms each seed and pushes it into the open furrow 136 to ensure good seed to soil contact before the furrow 136 is closed. FIG. 2 also illustrates an optional coulter wheel 22 and row cleaner 23 forward of the furrow opener 134.

The row unit 118 also includes a downforce adjustment mechanism 174 coupled to the main frame 14 and to the row unit sub-frame 130. The downforce adjustment mechanism 174 includes springs, pneumatics, hydraulics, linkages, and/or other structures such that when the downforce adjustment mechanism is activated, the downforce adjustment mechanism 174 pushes the row unit sub-frame 130 of the row unit 118 and consequently the furrow opener 134 into the soil 20 to dig the furrow 136. The gauge wheels 132, however, continue to ride along the top surface 158 of the soil 20. A depth 154 of the furrow 136 is measured from a top surface 158 of the soil 20 to the bottom 162 of the furrow 136, along a direction that is perpendicular to the top surface 158 (assuming a flat, non-inclined top surface 158), and therefore depends on a position of the gauge wheels 132 relative to the furrow opener 134. In some constructions, the depth 154 is equivalent to a distance between a bottom of the gauge wheel or wheels 132 and a bottom of the furrow opener 134.

With continued reference to FIG. 2, the gauge wheel(s) 132 are coupled to the sub-frame 130 with respective arms 166 and respective pivots 170. Stops 186 are also provided for each gauge wheel arm 166 to limit the upward rotation of each gauge wheel arm 166. The stops 186 are adjustable to a desired position to set the depth 154 of the furrow 136. The position of the stops 186 may be manually adjusted or a remote adjustment assembly may be included such as shown in U.S. Pat. No. 4,413,685, the entire contents of which are incorporated herein by reference. However, during operating conditions the gauge wheel arms 166 may not always be contacting the stops 186, and thus the actual depth 154 may not be determined solely by knowing the position of the stops 186. Additionally, the furrow opener 134 can wear during use, altering the actual depth 154. Thus, relying on the stops 186 alone is not sufficient to determine the actual depth 154 of the furrow 136 at any given time.

Each row unit 118 also includes at least one ground view sensor 148A operable to view toward and directly detect a surface of the ground. The illustrated ground view sensor 148A is operable to view into the furrow 136. The ground view sensor 148A is supported directly or indirectly by the sub-frame 130. The ground view sensor 148A may operate alone or with one or more additional ground view sensors (not shown) over the furrow 136 to view into and directly detect the furrow 136 (e.g., at the furrow bottom 162) and generate depth signals corresponding to an actual direct measurement of a depth 154 of the furrow 136. As mentioned herein, knowledge of the position of the gauge wheels 132 can yield a value corresponding to furrow depth 154. However, the ground view sensor 148A of FIG. 2 is adapted to detect furrow depth 154 directly, without reliance on detection of gauge wheels 132, gauge wheel arms 166, or other assumed dimensional values. By divorcing the ground view sensor 148A from measurement of the gauge wheels 132 and gauge wheel arms 166, complications arising from the variation among independent movements of the gauge wheels 132 and gauge wheel arms 166 of a given row unit 118 are avoided.

With reference to FIG. 2, the ground view sensor 148A described herein is positioned rearward of an effective point of the opener 134 (i.e., the longitudinal location at which the opener 134 opens the furrow 136) and forward of an effective point of the closer 140 (i.e., the longitudinal location at which the closer 140 closes the furrow 136) so as to be located above the furrow 136 and to overlap the furrow 136 in plan view. In some constructions, the ground view sensor 148A is centered over the width of the furrow 136 in a direction perpendicular to the longitudinal direction (i.e., the furrow width direction extends into the page when viewing FIG. 2). As illustrated, the ground view sensor 148A is also positioned rearward of a point of contact of the gauge wheel(s) 132 with the soil 20. The ground view sensor 148A can be operable to emit (i.e., from one or more emitters) sound or electromagnetic radiation into the furrow 136 and to detect (i.e., from one or more receivers) a reflection of the sound or electromagnetic radiation from the furrow in order to sense the furrow 136. The ground view sensor 148A thus forms a furrow depth sensor 148A. In other constructions, the ground view sensor 148A can be a passive sensor that senses the furrow 136 to measure furrow depth by detection of the furrow 136 only, without the sensor 148A emitting any sound or electromagnetic radiation.

In some constructions, the ground view sensor 148A is an optical sensor, and may include a photodiode operable to detect light, either within or outside of the visible spectrum. In some constructions, the sensor 148A comprises an infrared sensor, which may be referred to as an IR camera. Such an IR camera can detect the depth of the furrow 136, and may additionally detect the temperature of the furrow 136. The dispensed seeds may have a discernable temperature difference from the soil of the furrow 136, thus enabling seed identification and also seed position data to be collected from the ground view sensor 148A. In some constructions, the sensor 148A comprises an ultrasonic sensor, including an emitter operable to emit ultrasound waves and a receiver operable to detect reflected ultrasound waves that reflect off the furrow 136. In some constructions, the sensor 148A comprises a radar transmitter and receiver. In some constructions, the sensor 148A comprises a laser and a photodetector and may be referred to as a LiDAR or LADAR sensor. With appropriate placement and configuration, the ground view sensor 148A can detect a shape of the furrow 136, rather than just the maximum or central depth thereof. Thus, furrow shape data (i.e., 2-D or 3-D) can also be collected by the ground view sensor 148A. Optionally, more than one such sensor can be positioned above the furrow 136, either for redundancy or collaboratively detecting the furrow depth 154. Multiple sensors can be of the same type or a combination of different types. Multiple sensors can be positioned at the same longitudinal position on the row unit 118 or at spaced positions along the longitudinal direction. The illustrated sensor 148A is supported on a mounting arm that supports the furrow closer 140. In other constructions, the sensor 148A is supported by another structure of the row unit 118, e.g., a dedicated sensor arm or bracket, direct connection to the sub-frame 130, etc.

Although in some constructions, the row unit 118 includes only one or more ground view sensor 148A positioned directly over the furrow 136, FIG. 2 illustrates an optional complement of one or more additional ground view sensors 148B, 148C positioned outside the furrow 136 (e.g., adjacent, but ahead of the furrow 136). These additional ground view sensor(s) 148B, 148C are also supported directly or indirectly by the sub-frame 130. These additional sensor(s) 148B, 148C can utilize any of the type(s) of sensing technology described above for the furrow-viewing sensor 148A. Although the additional sensor(s) 148B, 148C cannot sense the furrow 136 directly, they can still operate as ground viewing sensors used in providing respective output signals related to the furrow depth 154. For example, when there is significant crop residue on the soil 20, the additional sensor(s) 148B, 148C ahead of the furrow 136 can detect how deep the opener 134 is into the soil 20. This is done by detecting reflected electromagnetic radiation off the top soil surface 158, in combination with the known positional relationship between the opener 134 and the sensor(s) 148B, 148C, since both are fixed with respect to the sub-frame 130.

Measurement data collected this way can be used together with the primary over-the-furrow sensor(s) 148A for redundancy, complementation, or compensation. The additional sensor(s) 148B, 148C can be positioned at a variety of locations on the row unit 118, at the same or different longitudinal positions. As illustrated, a first of the additional sensors 148B is supported on a forward end of the sub-frame 130, for example adjacent a linkage (parallel four-bar linkage) that couples the sub-frame 130 to the main frame 14. A second additional sensor 148C is illustrated as being supported on one of the links of the linkage, although other positions are optional. The sensors 148A, 148B, 148C can be aimed to point straight down, such that the sound and/or electromagnetic radiation emitted makes a 90-degree angle with the top surface 158 of the soil 20 as shown. In other constructions, one or more of the sensors 148A, 148B, 148C is or are aimed to point predominantly downward toward the soil 20, at an angle other than 90 degrees.

As illustrated in FIG. 2, in some constructions, ground detection signals from the ground view sensor(s) 148A, 148B, 148C are sent to a controller 178, which may calculate or interpret the depth 154 directly based on the ground detection signals. With respect to any sensor(s) 148A over the furrow 136, the only potential calculation that may be needed is simply the interpretation of distance (e.g., from a pulse reflection time) since the sensor 148A operates on direct observation of the furrow bottom 162. In some constructions, the signal output from the sensor(s) 148A may be already conditioned to represent the depth before reporting to the controller 178. The controller 178, when coupled to a global positioning system (GPS) signal processor, may generate a seed depth map and store that map for later analysis. In some constructions a display 182 is also provided (e.g., in an operator cab), which displays (e.g., in real time) the measured depth 154. The controller 178 may be positioned at various locations on seeding machine 10. For example, in some constructions the controller 178 is positioned within the operator cab, and signals are sent by wire or wirelessly from the sensor(s) 148A, 148B, 148C to the controller 178. In some constructions the sensor(s) 148A, 148B, 148C themselves each or collectively include a controller(s) 178. Other constructions include different locations for the controller 178. The provision of the sensor(s) 148A, 148B, 148C can, in some constructions, eliminate the need for depth calibration or calculation.

In some constructions the ground view sensor(s) 148A, 148B, 148C described herein provides (provide) signals to the controller 178 that correspond to the depth 154 of the furrow 136. The controller 178 (which may include a memory and a processor for receiving and sending signals and performing calculations) uses the received signals to activate and control movement of the downforce adjustment mechanism 174 and to thus control an overall downforce applied to the row unit 18.

Figure 3:
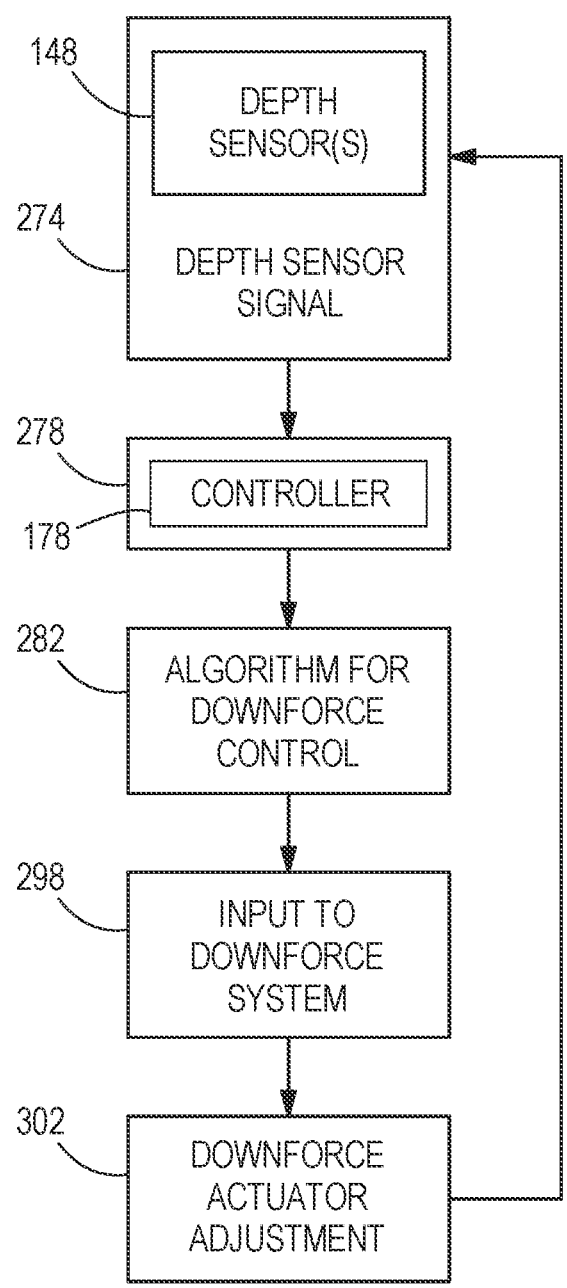
FIG. 3 is a flowchart illustrating a process for downforce control based on information from the ground view sensors of the embodiment of FIG. 2.

FIG. 3 illustrates one method of controlling downforce. In a first step 274, one or more of the ground view sensor(s) 148A, 148B, 148C, including at least the depth sensor 148A, generates (generate) signals. For the purpose of the flowchart of FIG. 3, the ground view sensor(s)—whether embodied as the singular sensor 148A, or as a plurality of sensors including the sensor 148A—are (is) referred to collectively as the depth sensor(s) 148. In a second step 278, the controller 178 receives the signals from the depth sensor(s) 148 (e.g., wirelessly or with a wired connection). In a third step 282, the controller 178 determines through an algorithm whether the depth 154 of the furrow 136 is within a suitable range of a target value and/or whether the depth is remaining consistent as the seeding machine 10 travels along a field, based on the signals received from the depth sensor(s) 148. If the controller 178 determines that the depth 154 of the furrow 136 is not remaining consistent (e.g., a range of averaged depth being equal to or greater than a preset limit value during a predetermined period of time), then in a fourth step 298, the controller 178 sends a signal to the downforce adjustment mechanism 174, and in a fifth step 302 the downforce adjustment mechanism 174 activates and adjusts (e.g., increases) the downforce on the row unit 18 to maintain a more consistent furrow depth. Once the downforce has been adjusted, the process repeats, such that the controller 178 is continuously receiving signals from the depth sensor(s) 148 and is continuously making adjustments to the downforce as needed (e.g., creating a closed loop). A similar process for closed-loop control can also be based more simply on whether the measured furrow depth 154 exceeds or fails to meet a desired set point, resulting in a corresponding decrease or increase in downforce via the downforce adjustment mechanism 174 (e.g., by an amount corresponding to the difference between actual measured depth and the set point).

In some constructions, the controller 178 additionally or alternatively uses the signals from the depth sensor(s) 148, including at least the depth sensor 148A, to control a forward travel speed of the seeding machine 10 (and its row unit or units 118). For example, in some constructions the controller 178 decreases the forward travel speed of the seeding machine 10 (e.g., via communication with a drive or motor of the seeding machine 10, for example, communication with a tractor pulling the seeding machine 10) if the controller 178 determines that the depth 154 of the furrow 136 is not remaining consistent for a predetermined period of time (e.g., one second, two seconds, three seconds, etc.). After adjusting the speed, the process may repeat, such that the controller 178 is continuously receiving signals from the position sensor or sensors 148 and is continuously making adjustments to the seeding machine speed as needed (e.g., creating a closed loop). In some constructions the downforce is increased and the seeding machine speed is decreased if the controller 178 determines that the depth of the furrow 136 is not remaining consistent for the predetermined period of time. If the controller 178 determines that the depth 154 of the furrow 136 is remaining consistent, then the downforce may be reduced (and in some constructions speed also changed). In some constructions, the controller 178 uses an algorithm that determines a maximum speed at which the seeding machine 10 (and its row unit or units 118) may move forward while still maintaining a consistent furrow depth. In other constructions, the controller 178 uses an algorithm that determines a minimum downforce at which the seeding machine 10 may maintain a consistent furrow depth.

In some constructions, the operator may set a desired forward travel speed (e.g., 6 mph, 8 mph, 10 mph, 12 mph, 14 mph, etc.), a maximum depth variation range (e.g., 0.1 inch, 0.3 inch, 0.5 inch, 0.7 inch, 0.9 inch, etc.), and a maximum downforce (e.g., 50 lb, 100 lb, 150 lb, 200 lb, 250 lb, 300 lb, 350 lb, 400 lb, etc.). If the controller 178 determines that the depth 154 of the furrow 136 is remaining consistent (i.e., that the depth variation range is equal to or less than the maximum depth variation range) and that the downforce is equal to or less than the maximum downforce, the controller 178 then operates the seeding machine 10 at the desired forward travel speed. If the controller determines that the depth 154 of the furrow 136 is not remaining consistent (i.e., the depth variation range is greater than the maximum depth variation range) or that the downforce is more than the maximum downforce, the controller 178 then slows the forward travel speed so that the depth consistency and the downforce may be within the desired values.

In some constructions, the seeding machine 10 utilizes a soil map (e.g., stored within a memory of the controller 178, and/or created manually). For example, in some constructions the controller 178 determines what settings (speed and downforce) are desirable to achieve the greatest furrow depth consistency, depending on different locations and soil conditions in a field. The controller 178 may then revert back to those settings the next time the seeding machine 10 is in that location of the field (or in another location of the field with the same type of soil), automatically choosing the same settings that obtained the greatest furrow depth consistency. In some constructions, the operator establishes different parameters for different soil types, and uses the stored soil map to set limits on the downforce and depth consistency for different types of soil on the map. For example, in sandy soil in which compaction may not be a concern, the operator may forego setting a maximum downforce and instead only control the forward travel speed to control the furrow depth consistency. In clay soil, in which compaction is more of a concern, the operator may set a lower maximum value for downforce and the speed may be decreased to obtain the desired furrow depth consistency. Overall, use of the soil map aids in establishing downforce and speed settings that will obtain desired furrow depth consistency in different field locations having different soil types.

Soil moisture may be used as another factor to include as a parameter for down force. For example, if the soil is wetter (i.e., has higher moisture), the maximum downforce parameter may be lowered for that area of the field to minimize soil compaction. Moisture may be determined in a variety of ways, to include a soil moisture sensor on the seeding machine 10 to determine moisture level in real time; mapped moisture data from previous moisture sensing; historical moisture data such as identified areas that typically have higher moisture during planting than other areas in the field based on topography or drainage systems, etc. In some constructions, one of the ground view sensors 148A, 148B, 148C disclosed herein for measuring furrow depth 154 may also be used, alone or in combination, for measuring soil moisture content, with soil moisture content derived from the signature of the reflection of the sound or electromagnetic radiation emitted toward the soil 20, preferably inside the furrow 136, although soil moisture data may be taken adjacent the furrow 136 in addition or as an alternative. The soil moisture content data can be derived from the analog parameters and/or digital data from the above mentions sensor(s) 148A, 148B, 148C, particularly sound/ultrasound or electromagnetic radiation/RF sensors. For example, soil moisture content variations change the dielectric constant of the soil and hence, change the reflection of RF waves (i.e., the intensity, phase, polarity, waveform, and reflected angle of the reflected waves). Information can thus be extracted from these measured reflected wave parameters.

As described above, the adjustments of downforce and speed may be made in a closed loop automated manner via the controller 178. Alternatively, in some constructions the depth consistency is displayed to an operator (e.g., on a visual display) and the operator can manually make adjustments to the downforce and/or speed as desired based on the signals from the depth sensor(s) 148.

While various different types of sensors 148A, 148B, 148C and associated methods are described herein, the seeding machine 10 may include and implement any one or more of the sensors and methods, or a combination thereof.

Additionally, the sensors 148A, 148B, 148C described herein may be disposed at various locations, including not only the exemplary locations explicitly disclosed. Additionally, the seeding machine 10 may use at least one controller, such as the controller 178, to receive signals from any of the sensors 148A, 148B, 148C described herein, and to use those signals to control one or more elements on the seeding machine 10 and/or to perform calculations relating to the seeding machine 10 (e.g., corresponding to furrow depth, positioning of components, etc.).

Following are several clauses describing various embodiments and concepts disclosed herein:

Clause 1. A row unit for a seeding machine operable to plant seeds into soil, the row unit comprising: a frame supporting a furrow opener for opening a furrow in the soil, a gauge wheel for rolling atop the soil, a seed meter for dispensing seeds into the furrow, and a furrow closer for closing the furrow; a downforce adjustment mechanism operable to push the row unit frame toward the soil to engage the furrow opener, the gauge wheel, and the furrow closer with the soil; a ground view sensor operable to sense the furrow and generate depth signals corresponding to actual sensed depth of the furrow; and a controller configured to receive the depth signals and output a control signal to the downforce adjustment mechanism, wherein the controller is programmed to adjust the downforce adjustment mechanism to adjust a downforce on the frame based on the depth signals such that downforce is increased in response to the depth signal indicating a depth less than a set point depth, and downforce is decreased in response to the depth signal indicating a depth greater than the set point depth.

Clause 2. The row unit of clause 1, wherein the controller is programmed to carry out closed-loop furrow depth adjustment through the depth signals and control of the downforce adjustment mechanism.

Clause 3. The row unit of clause 2, wherein the controller is further configured to carry out the closed-loop furrow depth adjustment with soil moisture content data delivered to the controller from the ground view sensor.

Clause 4. The row unit of clause 1, wherein a height difference, measured perpendicular to a soil top surface, between respective lowest points of the gauge wheel and the furrow opener defines a furrow depth setting, wherein the furrow depth setting is adjustable and used by the controller in determining the set point depth, and wherein the adjustment of the downforce by the controller is configured to further adjust actual furrow depth, without changing the furrow depth setting.

Clause 5. The row unit of clause 1, wherein the ground view sensor is operable to emit sound or electromagnetic radiation into the furrow and to detect a reflection of the sound or electromagnetic radiation in order to sense the furrow.

Clause 6. The row unit of clause 1, wherein the ground view sensor comprises an infrared sensor.

Clause 7. The row unit of clause 1, wherein the ground view sensor comprises an ultrasonic sensor.

Clause 8. The row unit of clause 1, wherein the ground view sensor is one of a plurality of ultrasonic sensors spaced along a longitudinal direction of the row unit that extends between the furrow opener and the furrow closer.

Clause 9. The row unit of clause 8, wherein the plurality of ultrasonic sensors includes at least one ultrasonic sensor operable to view the ground outside the furrow.

Clause 10. The row unit of clause 1, wherein the ground view sensor comprises a radar transmitter and receiver.

Clause 11. The row unit of clause 1, wherein the ground view sensor comprises an optical emitter and receiver.

Clause 12. The row unit of clause 1, wherein the ground view sensor is positioned on the frame to be longitudinally aligned with the furrow opener and the furrow closer.

Clause 13. A control system for adjusting downforce on a row unit for a seeding machine based on depth of a seeding furrow, the control system comprising: a ground view sensor operable to sense the furrow and generate depth signals corresponding to actual sensed depth of the furrow; and a processor configured to receive the depth signals from the ground view sensor and further configured to send signals to the downforce adjustment mechanism to adjust a downforce based on the depth signals in order to provide closed-loop furrow depth adjustment.

Clause 14. The control system of clause 13, wherein the processor is configured to adjust the downforce based additionally on signals received from at least one additional ground view sensor on the row unit.

Clause 15. The control system of clause 13, wherein the controller is further configured to provide the closed-loop furrow depth adjustment by using soil moisture content data that is derived from analog parameters and/or digital data of the ground view sensor and delivered to the controller.

Clause 16. The control system of clause 13, wherein the ground view sensor is operable to emit sound or electromagnetic radiation into the furrow and to detect a reflection of the sound or electromagnetic radiation in order to generate the depth signals.

Clause 17. The control system of clause 13, wherein the ground view sensor is one of a plurality of ultrasonic sensors, including at least one ultrasonic sensor operable to view the ground outside the furrow.

Clause 18. The row unit of clause 13, wherein the ground view sensor comprises a radar transmitter and receiver.

Clause 19. The row unit of clause 13, wherein the ground view sensor comprises an optical emitter and receiver.

Clause 20. The row unit of clause 13, wherein the ground view sensor is arranged to view along a center of a width of the furrow.

Any of the above referenced aspects of the disclosure can be combined with any one or more of the above referenced aspects of the disclosure.

Various features and advantages of the disclosure are set forth in the following claims.

What is claimed is:

1. A row unit for a seeding machine operable to plant seeds into soil, the row unit comprising:
a frame supporting a furrow opener for forming an open furrow in the soil, a gauge wheel for rolling along a top surface of the soil, a seed meter for dispensing seeds into the open furrow, and a furrow closer for closing the open furrow, wherein the open furrow has a furrow opening and an exposed furrow bottom, the furrow bottom positioned at a location in the open furrow that is maximally distanced from the furrow opening along a direction perpendicular to the top surface of the soil in which the open furrow is formed;
a downforce adjustment mechanism operable to push the row unit frame toward the soil to engage the furrow opener, the gauge wheel, and the furrow closer with the soil;
a ground view sensor positioned at a ground view sensor location, directed toward the open furrow, and operable to sense a distance between the ground view sensor location and the furrow bottom and generate depth signals; and
a controller configured to receive the depth signals and output a control signal to the downforce adjustment mechanism, wherein the controller is programmed to adjust the downforce adjustment mechanism to adjust a downforce on the frame based on the depth signals.

2. The row unit of claim 1, wherein the controller is programmed to carry out closed-loop furrow depth adjustment through the depth signals and control of the downforce adjustment mechanism.

3. The row unit of claim 2, wherein the controller is further configured to carry out the closed-loop furrow depth adjustment with soil moisture content data delivered to the controller from the ground view sensor.

4. The row unit of claim 1, wherein the ground view sensor is operable to emit sound or electromagnetic radiation into the open furrow and to detect a reflection of the sound or electromagnetic radiation in order to sense the open furrow.

5. The row unit of claim 1, wherein the ground view sensor comprises an infrared sensor.

6. The row unit of claim 1, wherein the ground view sensor comprises an ultrasonic sensor.

7. The row unit of claim 6, wherein the ultrasonic sensor is one of a plurality of ultrasonic sensors, one of which is operable to detect the ground external to the open furrow.

8. The row unit of claim 1, wherein the ground view sensor comprises a radar transmitter and receiver.

9. The row unit of claim 1, wherein the ground view sensor comprises an optical emitter and receiver.

10. The row unit of claim 1, wherein the ground view sensor is configured to detect a three-dimensional shape of the open furrow.

11. The row unit of claim 1, wherein the open furrow is a fully open furrow.

12. A control system for adjusting downforce on a row unit for a seeding machine based on depth of a furrow, the control system comprising:
a ground view sensor operable to sense a surface contour of an open furrow and generate signals corresponding to the surface contour of the open furrow, wherein the open furrow has a furrow opening and an exposed furrow bottom, the furrow bottom positioned at a location in the open furrow that is maximally distanced from the furrow opening along a direction perpendicular to a top surface of soil in which the open furrow is formed; and
a processor configured to receive the signals from the ground view sensor and further configured to send signals to a downforce adjustment mechanism to adjust a downforce based on the signals in order to provide closed-loop furrow depth adjustment.

13. The control system of claim 12, wherein the processor is configured to adjust the downforce based additionally on signals received from at least one additional ground view sensor on the row unit.

14. The row unit of claim 12, wherein the ground view sensor is arranged to view along a center of a width of the open furrow.

15. The control system of claim 12, wherein the ground view sensor is positioned at a ground view sensor location and wherein the surface contour includes a distance between the ground view sensor location and the furrow bottom.

16. A row unit for a seeding machine operable to plant seeds into soil, the row unit comprising:
A frame supporting a furrow opener for forming an open furrow in the soil, a gauge wheel for rolling atop the soil, a seed meter for dispensing seeds into the open furrow, and a furrow closer for closing the open furrow, wherein the open furrow has a furrow bottom;

a downforce adjustment mechanism operable to push the row unit frame toward the soil to engage the furrow opener, the gauge wheel, and the furrow closer with the soil; and the control system of claim 12.

17. The control system of claim 12, wherein the ground view sensor is operable to sense a soil type or a soil moisture of a soil that comprises the open furrow.

18. The control system of claim 12, wherein the surface contour is a full two-dimensional cross-sectional contour of the open furrow.

19. A row unit for a seeding machine operable to plant seeds into soil, the row unit comprising:

a frame supporting a furrow opener for forming an open furrow in the soil, a gauge wheel for rolling atop the soil, a seed meter for dispensing seeds into the open furrow, and a furrow closer for closing the open furrow, wherein the open furrow has a furrow shape, a furrow opening, and an exposed furrow bottom, the furrow bottom positioned at a location in the open furrow that is maximally distanced from the furrow opening along a direction perpendicular to a top surface of the soil in which the open furrow is formed;

a temperature sensor positioned at a temperature sensor location and operable to sense a temperature profile of the open furrow and generate temperature signals corresponding to a surface contour of the open furrow; and a data collection system configured to receive the temperature signals and collect temperature data, wherein the temperature data includes seed position data.

20. The row unit of claim 19, wherein the temperature sensor is operable to discern between the temperature of the open furrow and the temperature of a seed placed in the open furrow.

21. The row unit of claim 20, wherein the data collection system is operable to discern between a first type of seed and a second type of seed based on the temperature data.

22. The row unit of claim 19, wherein the temperature sensor is an infrared sensor that is operable to sense a depth of the open furrow and generate corresponding depth signals and wherein the row unit includes a processor configured to receive the depth signals from the infrared sensor and further configured to send signals to a downforce adjustment mechanism to adjust a downforce based on the depth signals in order to provide closed-loop furrow depth adjustment.

23. The row unit of claim 19, wherein the surface contour is a full three-dimensional contour of the open furrow.

\* \* \* \* \*